US011842218B2

(12) United States Patent
Qu et al.

(10) Patent No.: US 11,842,218 B2
(45) Date of Patent: *Dec. 12, 2023

(54) COMPUTING RESOURCE ALLOCATION FOR VIRTUAL NETWORK FUNCTIONS

(71) Applicant: Cisco Technology, Inc., San Jose, CA (US)

(72) Inventors: Yanping Qu, Fremont, CA (US); Sabita Jasty, San Jose, CA (US); Kaushik Pratap Biswas, San Jose, CA (US); Yegappan Lakshmanan, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,906

(22) Filed: Jan. 24, 2023

(65) Prior Publication Data
US 2023/0168937 A1 Jun. 1, 2023

Related U.S. Application Data

(63) Continuation of application No. 16/809,959, filed on Mar. 5, 2020, now Pat. No. 11,567,804.

(51) Int. Cl.
*G06F 9/50* (2006.01)
*G06F 9/455* (2018.01)

(52) U.S. Cl.
CPC ........ *G06F 9/5027* (2013.01); *G06F 9/45558* (2013.01); *G06F 2009/45562* (2013.01)

(58) Field of Classification Search
CPC .............. G06F 9/5027; G06F 9/45558; G06F 2009/45562; G06F 2009/4557; G06F 2009/45595
See application file for complete search history.

(56) References Cited

U.S. PATENT DOCUMENTS

| 10,069,680 | B1 * | 9/2018 | Wylie | ................... H04L 41/40 |
| 2012/0110582 | A1 * | 5/2012 | Ferdous | .............. G06F 11/3442 |
| | | | | 718/100 |

(Continued)

OTHER PUBLICATIONS

International Search Report and Written Opinion from the International Searching Authority, dated May 4, 2021, 12 pages, for corresponding International Patent Application No. PCT/US2021/018604.

(Continued)

*Primary Examiner* — Lewis A Bullock, Jr.
*Assistant Examiner* — Kevin X Lu
(74) *Attorney, Agent, or Firm* — Polsinelli

(57) ABSTRACT

A virtual machine management service obtains a request to instantiate a virtual machine image (VMI) to implement a virtual network function (VNF). The request specifies a set of processor requirements corresponding to instantiation of the VMI. In response to the request, the service identifies, from a server comprising a set of processor cores, available processor capacity. The service determines, based on the available processor capacity and the set of processor requirements, whether to instantiate the VMI on to a subset of processor cores of the server. Based on this determination, the service instantiates the VMI on to the subset of processor cores to implement the VNF.

20 Claims, 9 Drawing Sheets

(56) References Cited

U.S. PATENT DOCUMENTS

| | | | |
|---|---|---|---|
| 2015/0149608 A1* | 5/2015 | Kodali | H04L 47/70 709/224 |
| 2017/0242764 A1* | 8/2017 | Antony | G06F 11/2028 |
| 2017/0279735 A1* | 9/2017 | Yousaf | G06F 9/5083 |
| 2018/0017354 A1 | 6/2018 | Stokes et al. | |
| 2018/0267833 A1* | 9/2018 | Chen | G06F 9/45558 |
| 2020/0387401 A1* | 12/2020 | Zhou | G06F 18/24 |
| 2021/0117277 A1* | 4/2021 | Shetty | G06F 9/4881 |

OTHER PUBLICATIONS

Muhilan, Natarajan, et al., "Enterprise Network Functions Virtualization (ENFV) Architecture, Configuration and Troubleshooting," Cisco Live, Jan. 1, 2018, 84 pages.

Laghrissi, Abdelquoddouss, et al., "A Survey on the Placement of Virtual resources and Virtual Network Functions," IEEE Communications Surveys & Tutorials, vol. 21, No. 2, Dec. 3, 2018, pp. 1-26.

"Cisco Enterprise Network Function Virtualization Infrastructure Software Configuration Guide, Release 3.6.x," Cisco Systems, Inc., Nov. 27, 2019, 190 pages.

\* cited by examiner

COMPUTING RESOURCE ALLOCATION FOR VIRTUAL NETWORK FUNCTIONS

CROSS-REFERENCE TO RELATED APPLICATIONS

This application is a continuation of U.S. patent application Ser. No. 16/809,959, filed on Mar. 5, 2020, entitled "COMPUTING RESOURCE ALLOCATION FOR VIRTUAL NETWORK FUNCTIONS," which is expressly incorporated by reference herein in its entirety.

TECHNICAL FIELD

The present disclosure generally relates to the field of computer networking, particularly with regard to the provisioning and allocation of resources for virtual network functions.

BACKGROUND

With the proliferation of network function virtualization (NFV) technologies, many network functionalities that were previously performed by hardware devices, such as switching and firewall functions, are now routinely implemented by virtual appliances, e.g., virtual network functions (VNFs). These VNFs are often implemented with different central processing unit (CPU) load requirements. For instance, in a hyper-threaded environment, the pinning of the control-plane and data-plane of a VNF is not performed on the same physical CPU core. However, if the data-planes (e.g., data plane virtual CPUs (vCPUs)) from two different VNFs are pinned to the same physical CPU core, the performance of these VNFs can be unpredictable, which can result in degraded performance and other issues. The allocation of physical CPU cores to support these VNFs, thus, can be difficult to implement in an efficient manner that ensures a guaranteed level of performance for the VNFs while reducing the cost of maintaining the available physical CPU cores.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
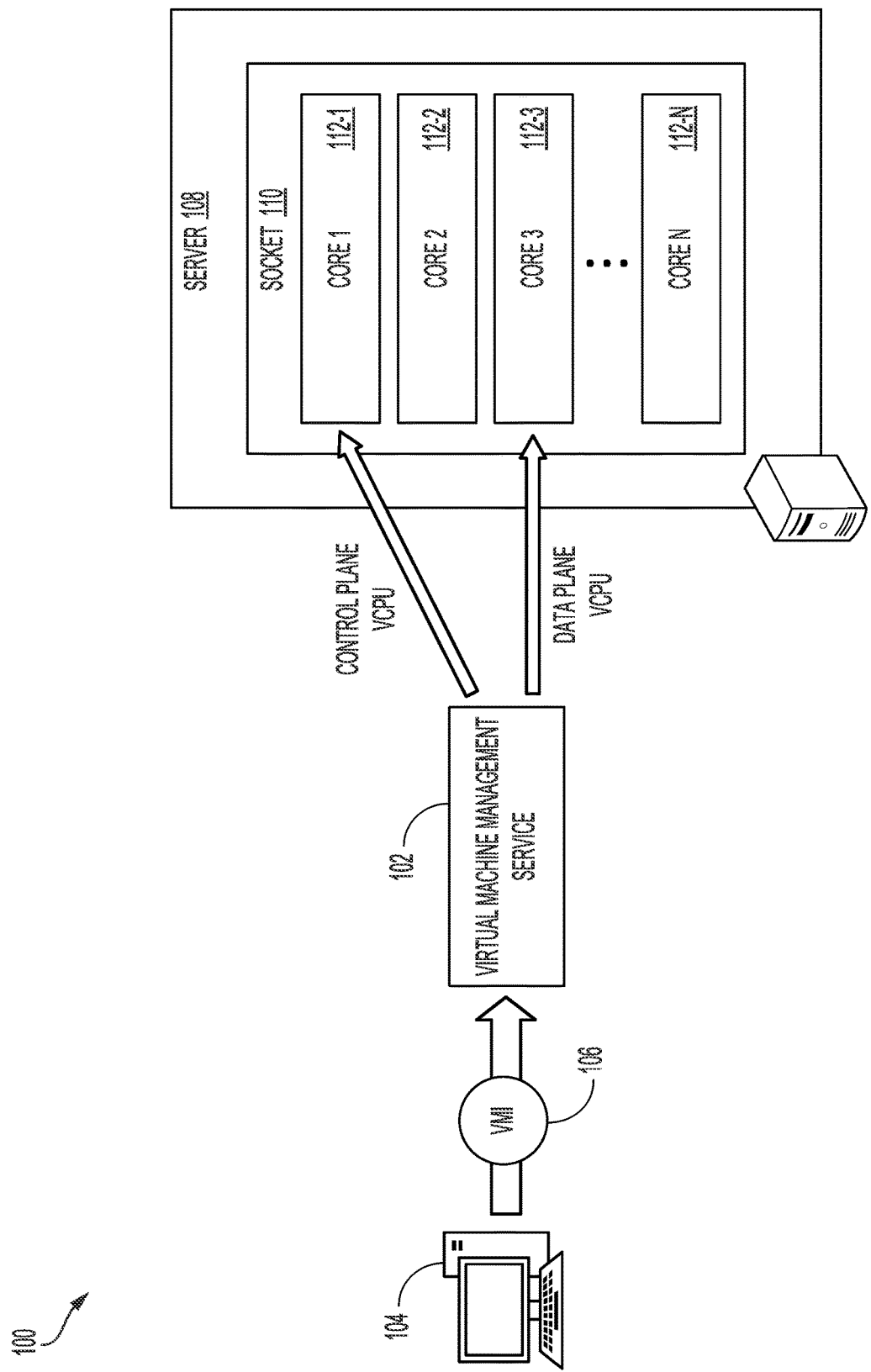
FIG. 1 shows an illustrative example of an environment in which a virtual machine management service instantiates a virtual machine image (VMI) onto one or more processor cores of a server based on a VMI profile and CPU capacity of the server in accordance with various implementations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for allocating processor cores and corresponding CPUs for use with VNFs and other virtual machines based on the requirements of these VNFs and other virtual machines.

In an example, a computer-implemented method performed by a virtual machine management service comprises obtaining a request to instantiate a virtual machine image to implement a set of VNFs. The request specifies a set of requirements corresponding to the instantiation of the virtual machine image. The computer-implemented method further comprises identifying, from a server that includes a set of processor cores configured to implement virtual machines subject to other processor requirements of the virtual machines, available processor capacity; determining, based on the available processor capacity and the one or more processor requirements, whether to instantiate the virtual machine image on to a subset of processor cores of the server yielding a determination; and instantiating, based on the determination, the virtual machine image on to the subset of the processor cores to implement the set of VNFs.

In an example, the set of requirements specify allocation of a processor core that provides low latency throughput of the VNFs via instantiation of the virtual machine image. As such, the computer-implemented method further comprises identifying, from the available processor capacity, at least one processor core that satisfies the set of processor requirements, such that the processor core is reserved to the VNFs. In another example, the set of requirements specify allocation of a first processor core for a data plane vCPU and a second processor core for a control plane vCPU. Using this set of requirements, the computer-implemented method further comprises identifying, from the available processor capacity, at least two processor cores that satisfy these requirements, wherein the first processor core is selected for the control plane vCPU and the second processor core is selected for the data plane vCPU.

In an example, the set of processor requirements specify allocation of any available processors for the set of virtual processors. Using this set of processor requirements, the computer-implemented method further comprises selecting, from the available processor capacity, a set of available processors from the subset of processor cores to implement the VNFs. In some examples, the selection of the set of available processors includes assigning data plane vCPUs to different processors of the set of available processors.

In another example, the computer-implemented method further comprises obtaining a second request to terminate a virtual machine operating on the subset of the processor cores. In response to the second request, the virtual machine is terminated. Further, the computer-implemented method comprises reserving the capacity of the subset of the processor cores for the virtual machine.

In an example, a system comprises one or more processors and memory including instructions that, as a result of being executed by the one or more processors, cause the system to receive a request to instantiate a virtual machine image to implement a set of VNFs. The request specifies a set of processor requirements corresponding to instantiation of the virtual machine image. The instructions further cause the system to identify available processor capacity of a server configured to implement virtual machines subject to other processor requirements of the virtual machines, as well as determine, based on the available processor capacity and the set of processor requirements, whether to instantiate the virtual machine image on to a set of processor cores of the server to yield a determination. The instructions further cause the system to instantiate, based on the determination, the virtual machine image on to the set of processor cores to implement the set of VNFs.

In an example, a non-transitory computer-readable storage medium stores thereon executable instructions that, as a result of being executed by one or more processors of a computer system, cause the computer system to receive a request to instantiate a virtual machine image to implement a set of VNFs. The request specifies a set of processor requirements corresponding to instantiation of the virtual machine image. The executable instructions further cause the computer system to identify available processor capacity of a server configured to implement virtual machines subject to other processor requirements of the virtual machines, as well as determine, based on the available processor capacity and the set of processor requirements, whether to instantiate the virtual machine image on to a set of processor cores of the server to yield a determination. The executable instructions further cause the computer system to instantiate, based on the determination, the virtual machine image on to the set of processor cores to implement the set of VNFs.

Description of Example Embodiments

Figure 8:
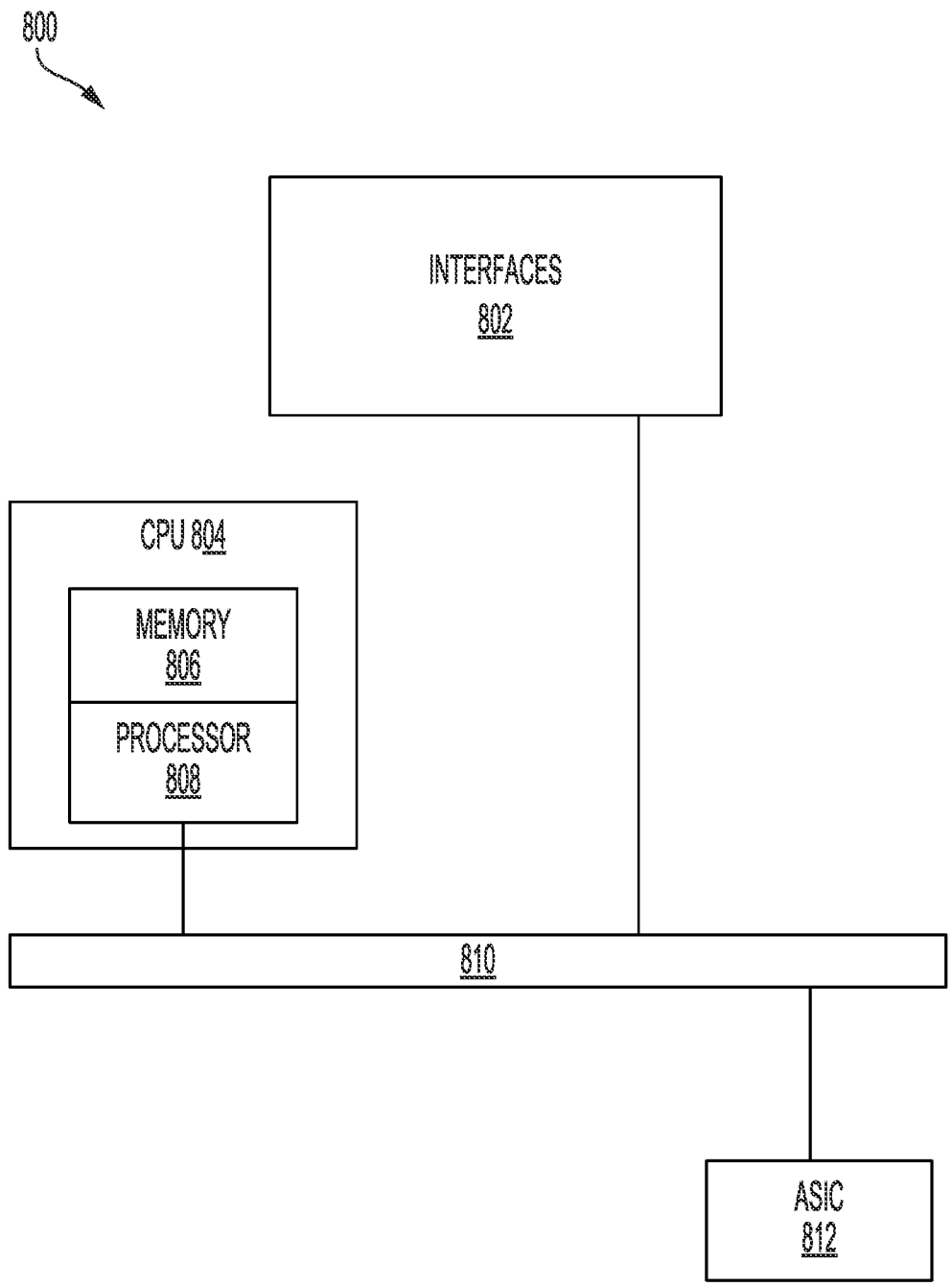
FIG. 8 illustrates an example network device suitable for performing switching, routing, and other networking operations in accordance with some implementations.
Figure 9:
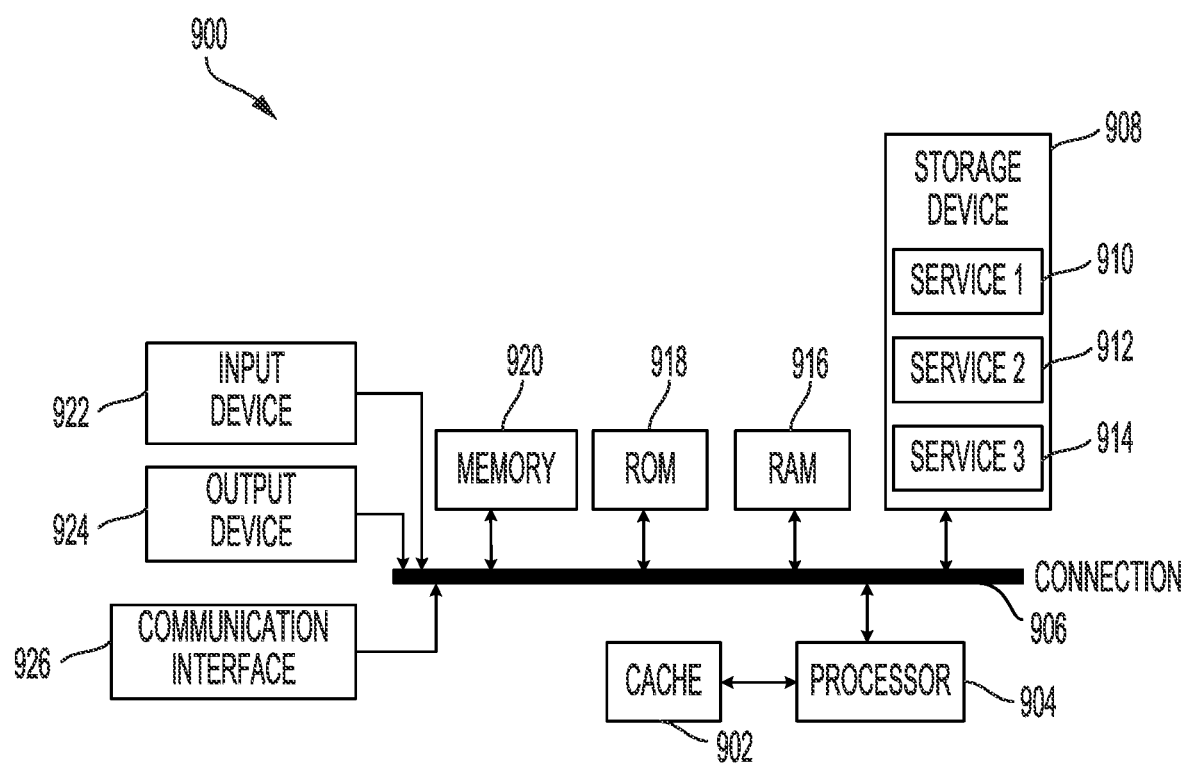
FIG. 9 illustrates a computing system architecture including various components in electrical communication with each other using a connection in accordance with some implementations.

Disclosed herein are systems, methods and computer-readable storage media for providing real-time remote attestation for network enclaves across enclave servers, physical and virtual network devices, and applications operating within the enclave domain. The present technologies will be described in more detail in the following disclosure as follows. The discussion begins with a detailed description of example systems, processes and environments for obtaining and providing attestation information for various network and compute components within a particular network enclave, as illustrated in FIGS. 1 through 7, will then follow. The discussion concludes with a description of an example network and computing devices, as illustrated in FIGS. 8 and 9.

FIG. 1 shows an illustrative example of an environment 100 in which a virtual machine management service 102 instantiates a virtual machine image (VMI) 106 onto one or more processor cores of a server 108 based on a VMI profile and CPU capacity of the server 108 in accordance with various implementations. In the environment 100, a user, via a client device 104, transmits a request to a virtual machine management service 102 to instantiate a VMI 106 on to a server 108 in order to implement a set of VNFs or other virtual machines. For instance, the user may wish to implement a VNF (e.g., implementation of a network function on a virtual machine rather than on physical specialized hardware) on to a server 108 in order to handle specific network functions on behalf of the user. The underlying resources for the VNF may be scalable such that, based on the resource demands of the VNF, additional resources may be allocated to provide the necessary functionality for the VNF. It should be noted that while VNFs are used extensively throughout the present disclosure for the purpose of illustration, other virtual machines in addition to, or as an alternative to, VNFs may be implemented on the server 108. For instance, the server 108 may be used to implement a combination of VNFs and application virtual machines.

In an example, the server 108 is provided by the virtual machine management service 102 to provide the foundation of a network functions virtualization infrastructure (NFVI). The NFVI may comprise the hardware and software components that collectively provide the functionality for implementing VNFs and other virtual machines. For instance, the server 108 can include one or more CPU sockets 110, which provides physical connectivity, via a set of pins, between a CPU chip and a motherboard of the server 108. While the server 108 illustrated in FIG. 1 is represented as having a single CPU socket 110, the server 108 may be configured with multiple CPU sockets, where each CPU socket may be configured to implement a CPU chip.

In some examples, a CPU chip includes a set of processor cores 112-1-112-N. The CPU chip may be an integrated circuit installed on the server 108 via the CPU socket 110. Through the implementation of the set of processor cores 112-1-112-N, the CPU chip may offer hyper-threading in order to provide parallel computational capabilities. For instance, a processor core that is configured to provide hyper-threading may appear as two or more logical CPUs to an operating system of the server 108. However, the actual CPU chip maintains a single set of execution resources for each processor core 112-1-112-N. Thus, the two or more logical CPUs may share the physical execution resources of their respective processor core 112-1-112-N.

While a processor core that implements hyper-threading may appear as two or more logical CPUs to an operating system of the server 108, implementing data plane vCPUs for different VNFs on to the same processor core or on to the same CPU thread can result in issues with regard to the performance of each of the data plane vCPUs. For instance, if two or more data plane vCPUs from different VNFs are implemented on to the same processor core 112-1-112-N, these different VNFs may experience unpredictable performance, as the two or more data plane vCPUs may each compete for available resources of the processor core. This may result in an increase in latency and, in some instances, VNF failure.

To mitigate the risk of implementing data plane vCPUs of different VNFs and other virtual machines on to the same processor core or CPU thread, the virtual machine management service 102 may implement a set of rules that, by default, would result in allocation of different processor cores for a VNF. For instance, in response to a request to instantiate a VMI 106 on to the server 108 to implement a VNF or other virtual machine, the virtual machine management service 102 may identify the current CPU allocations within the socket 110 for implementation of other VNFs and other virtual machines. The virtual machine management service 102 may evaluate a server database of the server 108 to identify which processor cores 112-1-112-N are being utilized for other VNFs or virtual machines. In some instances, the virtual machine management service 102 may identify which processor cores 112-1-112-N are being utilized to implement data plane vCPUs for these other VNFs or virtual machines.

Based on the allocation of the processor cores 112-1-112-N for other VNFs and virtual machines, the virtual machine management service 102 may identify the available processor capacity of the socket 110. As noted above, a processor core may be implemented with hyper-threading such that the processor core may appear as two or more logical CPUs to an operating system of the server 108. While a data plane vCPU may be implemented using a single logical CPU of a processor core, the other logical CPUs of the processor core may be unavailable for implementation of other data plane vCPUs of other VNFs and virtual machines in order to avoid unpredictable behavior among these VNFs and virtual machines. Thus, in the identification of available processor capacity, the virtual machine management service 102 may determine that these other logical CPUs are not available for use regardless of whether these other logical CPUs have sufficient capacity to implement additional vCPUs for a VNF or other virtual machine.

In an example, based on the available processor capacity within the socket 110 and the current allocation of processor capacity for other VNFs and virtual machines, the virtual machine management service 102 identifies one or more processor cores that can be allocated for instantiation of the VMI 106 and, thus, implementation of a new VNF or virtual machine in response to the user request. For instance, as illustrated in FIG. 1, the virtual machine management service 102 has identified processor core 112-1 and processor core 112-3 as having available processor capacity to instantiate the VMI 106 and implement the VNF or other virtual machine. The virtual machine management service 102 may allocate processor core 112-1 and processor core 112-3 in a dedicated manner, such that these processor cores are reserved for the exclusive use of the VNF or other virtual machine that is to be implemented via instantiation of the VMI 106.

In an example, for a VNF or other virtual machine, the virtual machine management service 102 implements the data plane vCPU and the control plane vCPU of the VNF or other virtual machine on to distinct processor cores in order to ensure that sufficient resources are available for these vCPUs during operation of the VNF or other virtual machine. This may provide improved low latency throughput for the VNF or other virtual machine. The virtual machine management service 102, in an example, designates these processor cores are being dedicated for the VNF or other virtual machine such that the resources (e.g., processor capacity) of these processor cores cannot be shared with other VNFs or virtual machines, regardless of whether these resources are in an idle state or in use.

In an example, the virtual machine management service 102 allows the user to define a VMI profile for the VMI 106. The VMI profile may be used to define one or more processor requirements for instantiation of the VMI 106 and implementation of the corresponding VNF or other virtual machine. The VMI profile may be included within the VMI 106 such that the VMI profile may be provided to the virtual machine management service 102 with every request to instantiate the VMI 106. Alternatively, the VMI profile may be provided as a part of the request, separate from the VMI 106. This may allow the user to define different VMI profiles for the same VMI 106. In some instances, the virtual machine management service 102 may provide, to the user via the client device 104, an interface (e.g., graphical user interface (GUI), application programming interface (API)

commands, etc.) to allow the user to define, via the interface, the VMI profile for instantiation of the VMI 106.

Through the VMI profile, the user may define the set of one or more processor requirements for implementation of a VNF or other virtual machine using the VMI 106. For instance, through the VMI profile, the user may specify that the control plane vCPU and the data plane vCPU for the VNF or other virtual machine are to be implemented on distinct, dedicated processor cores. Alternatively, the user may specify that the control plane vCPU and the data plane vCPU are to be implemented (e.g., pinned) to the same processor core. In some instances, the user may specify that the vCPUs of the VNF or other virtual machine may be implemented on shareable processor cores, whereby the resources of the shareable processor core may be shared among any number of VNFs and virtual machines subject to a set of default rules established by the virtual machine management service 102. For instance, as noted above, a default rule may include a prohibition on the implementation of two or more data plane vCPUs on the same logical CPU of a processor core or on the same processor core entirely.

In an example, the user can specify, in the VMI profile, that the resulting VNF or virtual machine is to have low-latency throughput. For instance, in the VMI profile, the user may provide an entry (e.g., "low-latency=TRUE," etc.) that, as a result of being processed by the virtual machine management service 102, causes the virtual machine management service 102 to determine that low latency throughput is required for the VNF or other virtual machine to be implemented through instantiation of the VMI 106. Alternatively, in the VMI profile, the user may indicate that low latency throughput is not required (e.g., "low-latency=FALSE," etc.).

In addition to defining whether low latency throughput is required for the VNF or other virtual machine, the user may define, through the VMI profile, the number of vCPUs required for the VNF or other virtual machine, as well as identifiers corresponding to control plane vCPUs and data plane vCPUs. This may allow the virtual machine management service 102 to determine how many vCPUs are required for implementation of the VNF or other virtual machine, as well as the allocation requirements in order to avoid allocation of data plane vCPUs on to the same processor core or logical CPU of a processor core. Based on the requirements specified in the VMI profile, the virtual machine management service 102 may determine what processor capacity is required for implementation of the VNF or other virtual machine.

As noted above, the virtual machine management service 102 may implement a set of default rules for allocation of processor capacity for new VNFs and virtual machines. In an example, if the user does not provide a VMI profile or otherwise does not define a set of requirements for allocation of processor capacity for the VNF or other virtual machine, the virtual machine management service 102 may rely on this set of default rules in order to allocate processor capacity for implementation of the VNF or other virtual machine. For instance, by default, the virtual machine management service 102 may assume that the VNF or other virtual machine requires low latency throughput. This may cause the virtual machine management service 102 to allocate dedicated processor cores for the VNF or other virtual machine. In some examples, the virtual machine management service 102 evaluates the VMI 106 to estimate the system requirements for the VNF or other virtual machine that is to be implemented via instantiation of the VMI 106. This may include identifying the operating system, data files, and applications that form the VMI 106. From this, the virtual machine management service 102 may determine what processor performance may be required in order to implement a VNF or other virtual machine generated via instantiation of the VMI 106.

Based on the VMI profile and/or the default set of rules maintained by the virtual machine management service 102, the virtual machine management service 102 may determine whether the processor cores 112-1-112-N of the CPU socket 110 include sufficient available processor capacity for implementation of the VNF or other virtual machine. For instance, as noted above, the virtual machine management service 102 may evaluate a server database of the server 108 to identify which processor cores 112-1-112-N are being utilized for other VNFs or virtual machines. In some instances, the virtual machine management service 102 may identify which processor cores 112-1-112-N are being utilized to implement data plane vCPUs for these other VNFs or virtual machines. Through this process, the virtual machine management service 102 may identify the available processor capacity for the CPU socket 110.

In response to determining the available processor capacity for the CPU socket 110, and the present allocation of processor capacity to other VNFs and virtual machines, the virtual machine management service 102 may determine whether any of the available processor capacity can be allocated for implementation of the new VNF or other virtual machine through instantiation of the VMI 106. For instance, while the available processor capacity may be sufficient to implement the VNF or other virtual machine, this available processor capacity may not satisfy the set of requirements defined in the VMI profile and/or the default set of rules maintained by the virtual machine management service 102. For instance, if the new VNF or virtual machine is to be implemented using a dedicated processor core for each vCPU, and the virtual machine management service 102 determines that there are insufficient processor cores that can be dedicated for this purpose, the virtual machine management service 102 may indicate that the CPU socket 110 does not have sufficient processor capacity to implement the VNF or virtual machine, regardless of whether (in aggregate) there is available processor capacity among the processor cores to implement a VNF or virtual machine.

In an example, the virtual machine management service 102 determines, in response to the request to instantiate the VMI 106, whether any existing VNFs or virtual machines are scheduled for deletion. For instance, the virtual machine management service 102 may evaluate the server database of the server 108 to identify the VNFs or virtual machines that are scheduled to be deleted and an estimate as to the time at which the VNFs or virtual machines are to be deleted. Based on this evaluation, the virtual machine management service 102 may determine when additional processor capacity of the CPU socket 110 will become available for implementing new VNFs and virtual machines via instantiation of the VMI 106. The virtual machine management service 102 may use this determination as a factor in determining whether there is available processor capacity for the new VNF or virtual machine. For instance, if the virtual machine management service 102 determines that a set of processor cores are to become available for allocation within a particular period of time, the virtual machine management service 102 may determine that this set of processor cores may be allocated for the VNF or other virtual machine subject to the set of processor requirements defined by the user or by the virtual machine management service 102.

In some examples, fulfillment of the request can be subject to a timeout period whereby the virtual machine management service 102 continues to evaluate the CPU socket 110 to determine whether there is sufficient available processor capacity that can be allocated for the new VNF or virtual machine. For instance, if the virtual machine management service 102 initially determines that the request to instantiate the VMI 106 cannot be fulfilled as a result of insufficient processor capacity being available for the new VNF or virtual machine, the virtual machine management service 102 may continue to monitor the CPU socket 110 and the server database 108 to determine if any additional processor capacity becomes available prior to the expiration of the timeout period of the request. Thus, the virtual machine management service 102 may attempt to fulfill the request, subject to the processor requirements defined in the VMI profile or in the default set of rules maintained by the virtual machine management service 102, so long as the timeout period has not elapsed. If the timeout period has elapsed, the virtual machine management service 102 may indicate that the request could not be fulfilled as a result of a lack in available processor capacity for the VNF or virtual machine.

In an example, the virtual machine management service 102 obtains a request, from the client device 104, to terminate an existing VNF or virtual machine operating within the server 108. In response to the request, the virtual machine management service 102 may identify the processor cores and corresponding logical CPUs that are used to implement the VNF or virtual machine. In some examples, the virtual machine management service 102 terminates the specified VNF or virtual machine and reserves the previously used processor capacity from the processor cores and corresponding logical CPUs for the VNF or virtual machine for a period of time. For instance, in the request, a user may specify that the resources used to implement the VNF or virtual machine are to be reserved in order to allow the user to re-implement the VNF or virtual machine at a later time. The virtual machine management service 102 may reserve this processor capacity until the previously determined period of time has elapsed. If the period of time has elapsed, the virtual machine management service 102 may release this processor capacity for use in implementing other VNFs and virtual machines.

Figure 2:
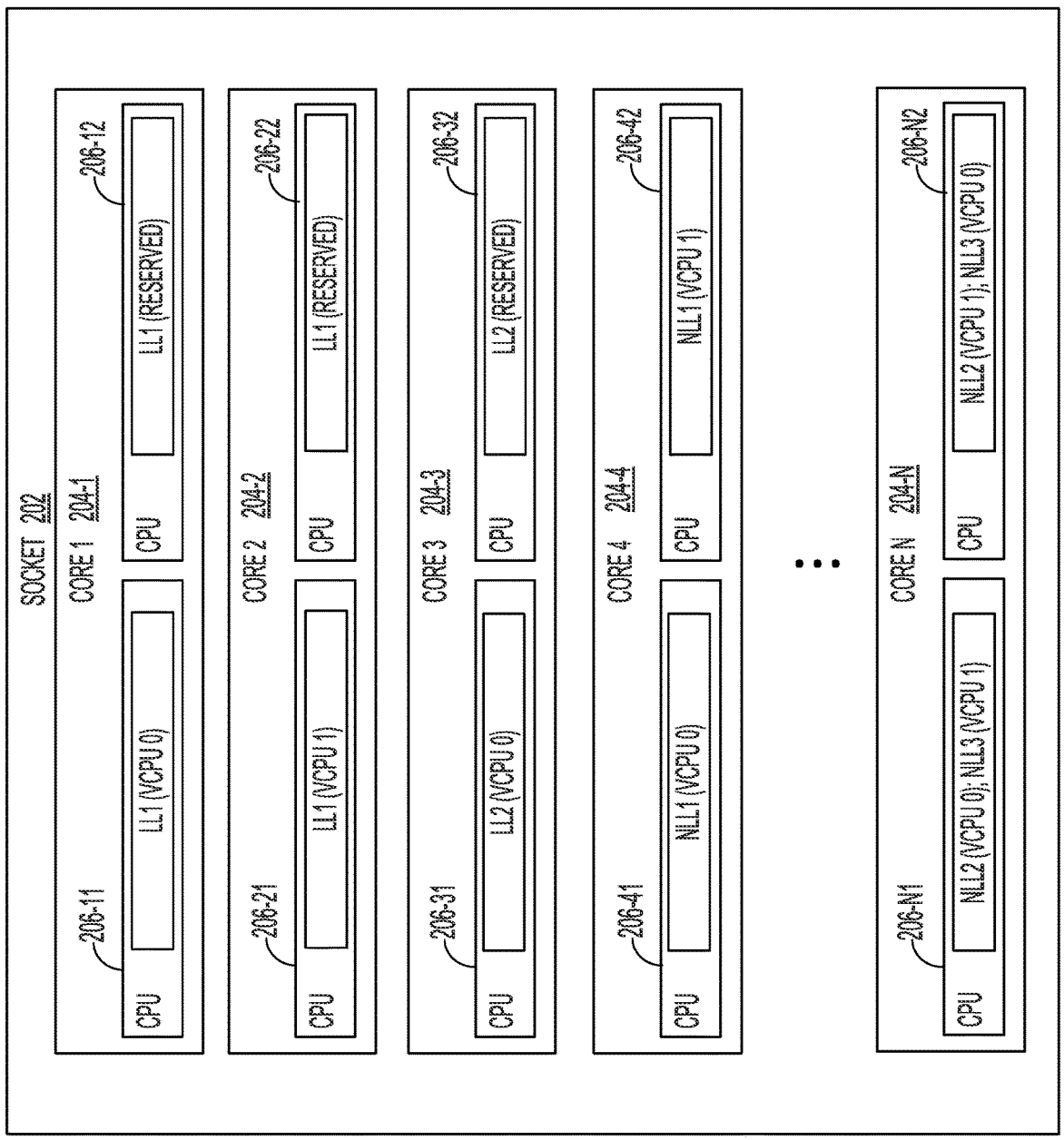
FIG. 2 shows an illustrative example of an environment in which VNFs are allocated different CPUs from processor cores of a socket based on the requirements of the VNFs in accordance with various implementations.

FIG. 2 shows an illustrative example of an environment 200 in which VNFs are allocated different CPUs from processor cores of a socket 202 based on the requirements of the VNFs in accordance with various implementations. In the environment 200, the CPU socket 202 includes a set of processor cores 204-1-204-N, wherein each processor core implements hyper-threading to allow for operating system detection of a pair of logical CPUs for each processor core. For instance, as illustrated in FIG. 2, processor core 204-1 is configured with hyper-threading such that the processor core 204-1 includes a first logical CPU 206-11 and a second logical CPU 206-12. Similarly, processor core 204-2 (e.g., logical CPU 206-21 and logical CPU 206-22), processor core 204-3 (e.g., logical CPU 206-31 and logical CPU 206-32), processor core 204-4 (e.g., logical CPU 206-41 and logical CPU 206-42), and processor core 204-N (e.g., logical CPU 206-N1 and logical CPU 206-N2) may also be configured with hyper-threading.

As illustrated in FIG. 2, the various logical CPUs of the processor cores 204-1-204-N may be allocated for different VNFs and virtual machines subject to the processor requirements of these VNFs and virtual machines. For example, a VNF that is implemented to have low latency throughput and two vCPUs (e.g., LL1, as illustrated in FIG. 2), may be allocated two dedicated processor cores (e.g., processor core 204-1 and processor core 204-2). A first dedicated processor core may be used to implement a data plane vCPU of the VNF while a second dedicated processor core may be used to implement a control plane vCPU of the VNF. While each of these vCPUs may be implemented using a single logical CPU from a dedicated processor core, the other logical CPU may be reserved for the VNF. Thus, the other logical CPUs may not be shared with other VNFs or other virtual machines.

In some examples, other virtual functionality of the VNF or virtual machine, such as emulation or virtual hosting, can be performed using the other logical CPUs of the VNF or virtual machine that have been reserved for the VNF or virtual machine and are not used to implement either the control plane vCPU or the data plane vCPU. In some instances, this other virtual functionality of the VNF or virtual machine may be implemented using the other logical CPU of the processor core that implements the control plane vCPU. This may allow the data plane vCPU to use any of the resources of the dedicated processor core without encountering possible interference resulting from this other virtual functionality of the VNF. The performance of this other virtual functionality may be subject to the processor requirements set forth in the VMI profile or as defined by the virtual machine management service through the implementation of a default set of rules for processor management and allocation.

For a VNF or virtual machine that requires low latency throughput but only a single vCPU (e.g., LL2, as illustrated in FIG. 2), the virtual machine management service may allocate a single dedicated processor core (e.g., processor core 204-3). A first logical CPU 206-31 of the processor core 204-3 may be allocated for the vCPU of the VNF or virtual machine. The second logical CPU 206-32 may be reserved for the VNF or virtual machine, such that the resources of the second logical CPU 206-32 cannot be shared with other VNFs or other virtual machines. This reserved logical CPU 206-32 may also be used to provide additional virtual functionality of the VNF, including, but not limited to, emulation and virtual hosting capabilities.

In an example, a user can indicate, via a VMI profile, that a new VNF or virtual machine can be implemented using shareable resources. For instance, via the VMI profile, the user may specify that the new VNF or virtual machine does not require low latency throughput. If the number of available processor cores is greater than zero, the virtual machine management service may allocate a number of the available processor cores to the VNF or virtual machine required to implement the number of vCPUs for the VNF or virtual machine. As an illustrative example, processor core 204-4 is allocated to a non-low latency VNF (e.g., NLL1), whereby the first logical CPU 206-41 is allocated for a control plane vCPU and the second logical CPU 206-42 is allocated for a data plane vCPU. The virtual machine management service may designate this processor core 204-4 and the corresponding logical CPUs 206-41 and 206-42 as being sharable. Thus, any available capacity of these logical CPUs 206-41 and 206-42 may be allocated to other VNFs if there are no other available processor cores for implementation of these other VNFs.

In an example, if a new VNF or virtual machine can be implemented using shareable resources but there is no available processor core for implementation of the VNF, the virtual machine management service determines whether there is any available processor capacity within any of the shareable processor cores that can be used to implement the VNF. For instance, as illustrated in FIG. 2, a VNF or other virtual machine (e.g., NLL3) may be allocated available processor capacity from processor core 204-N. In an example, the virtual machine management service allocates processor capacity from a first logical CPU 206-N1 allocated for a data plane vCPU of a previously implemented VNF to the control plane vCPU of the new VNF. This may prevent having two or more data plane vCPUs being allocated the same logical CPU, which can result in unpredictable performance of the corresponding VNFs or virtual machines. Thus, as illustrated in FIG. 2, the two VNFs (e.g., NLL2 and NLL3) may share resources of the processor core 204-N1 such that the first logical CPU 206-N1 of the processor core 204-N1 is allocated for a control plane vCPU of a first VNF (e.g., vCPU 0 for NLL2) and a data plane vCPU of the second VNF (e.g., vCPU 1 for NLL3) and the second logical CPU 206-N2 of the processor core 204-N1 is allocated for a data plane vCPU of the first VNF (e.g., vCPU 1 for NLL2) and a control plane vCPU of the second VNF (e.g., vCPU 0 for NLL3).

Figure 3:
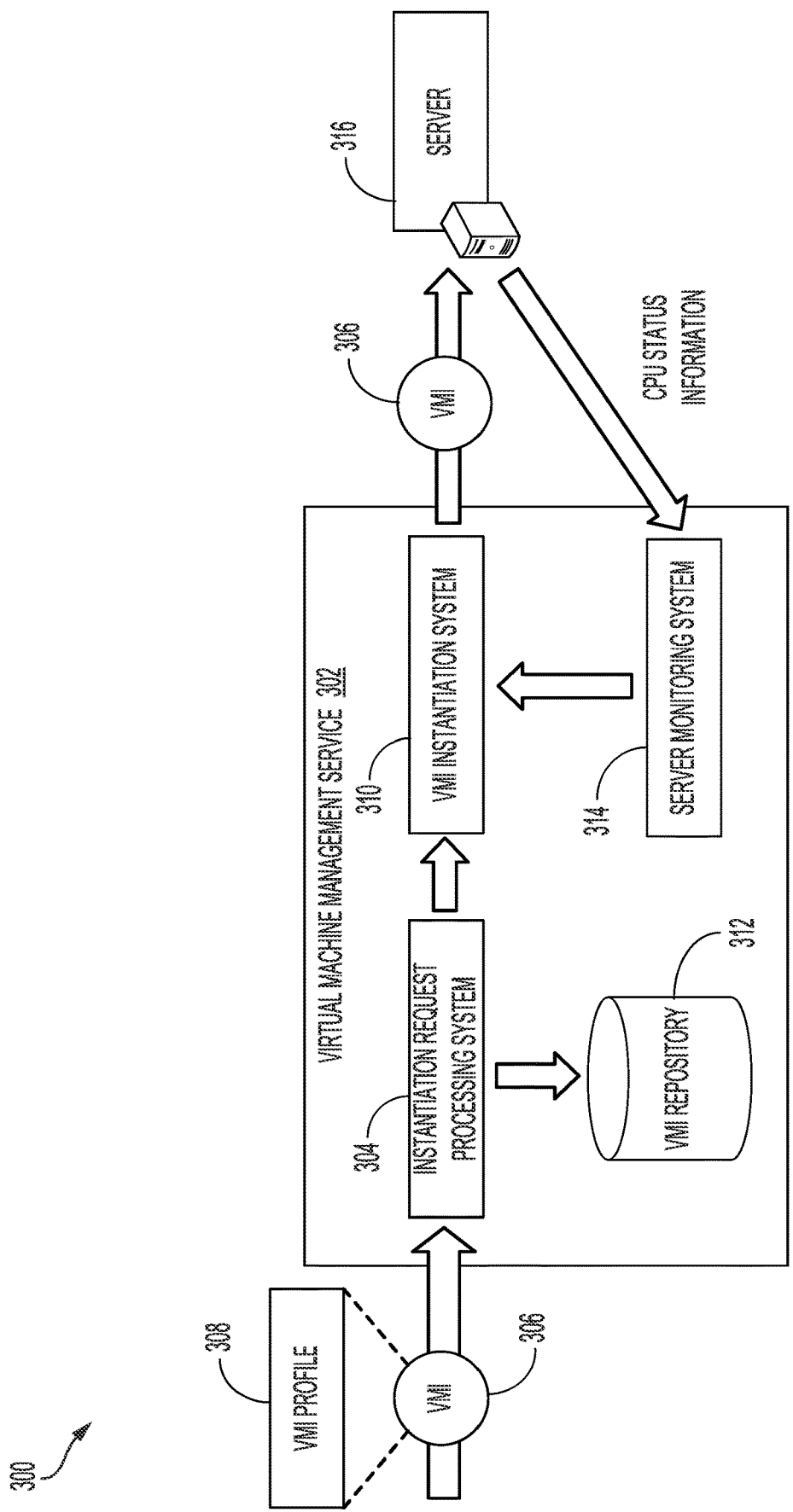
FIG. 3 shows an illustrative example of an environment in which a virtual machine management service allocates CPU capacity of a server for instantiation of a VMI based on the available CPU capacity of the server and a set of processor requirements in accordance with various implementations.

FIG. 3 shows an illustrative example of an environment 300 in which a virtual machine management service 302 allocates CPU capacity of a server 316 for instantiation of a VMI based on the available CPU capacity of the server 316 and a set of processor requirements in accordance with various implementations. In the environment 300, an instantiation request processing system 304 of the virtual machine management service 302 obtains a request on instantiate a VMI 306 on to one or more processor cores of a server 316 in order to implement a new VNF or virtual machine. The instantiation request processing system 304 may store the VMI 306 in a VMI repository 312 in order to allow for re-instantiation of the VMI 306 in the event of an issue that results in impairment of the VNF or virtual machine. For example, if a VNF or virtual machine is rendered inoperative as a result of a server failure, the instantiation request processing system 304 may obtain the corresponding VMI 306 from the VMI repository 312 and provide the VMI 306 to the VMI instantiation system 310 to re-instantiation of the VMI 306 on to resources of another server.

In an example, the request includes a VMI profile 308 that specifies a set of processor requirements for the new VNF or virtual machine. For instance, the VMI profile 308 may be provided in the VMI 306 such that instantiation of the VMI 306 may be subject to the requirements defined in the VMI profile 308. Alternatively, the VMI profile 308 may be provided in addition to the VMI 306 in the request. Thus, a user may define, through different VMI profiles, different processor requirements for instantiation of the VMI 306.

In an example, the processor requirements specified in the VMI profile 308 are used by a VMI instantiation system 310 of the virtual machine management service 302 to determine what resources of the server 316 are required to instantiate the VMI 306 and implement the VNF or virtual machine. For instance, if the VMI profile 308 specifies that a VNF or virtual machine is to have low latency throughput and that it is to include two vCPUs (e.g., a data plane vCPU and a control plane vCPU), the VMI instantiation system 310 may determine that at least two processor cores from the server 316 are required to implement the VNF or virtual machine. Alternatively, if the VMI profile 308 specifies that a VNF or virtual machine does not require low latency throughput and that it is to include two vCPUs, the VMI instantiation system 310 may determine that shareable resources may be allocated for the VNF or virtual machine. The VMI instantiation system 310 may attempt to identify a shareable processor core that is unallocated for other VNFs or other virtual machines. If unsuccessful, the VMI instantiation system 310 may identify a shareable processor core that has available capacity to allow for implementation of the new VNF or virtual machine subject to other processor requirements (e.g., data plane vCPUs of different VNFs cannot share a logical CPU, etc.).

To determine whether the request to instantiate the VMI 306 can be fulfilled subject to the set of processor requirements specified in the VMI profile 308 or implemented by default by the virtual machine management service 302, the VMI instantiation system 310 may obtain, from a server monitoring system 314, CPU status information for each of the processor cores of the server 316. This CPU status information may specify the current logical CPU and processor core assignments within the server 316, as well as information specifying the available processor capacity within the server 316. Based on this CPU status information, the VMI instantiation system 310 may determine whether the server 316 has sufficient available processor capacity for the new VNF or virtual machine. For instance, if the set of processor requirements indicate that two processor cores are required for implementation of a VNF or virtual machine and that these two processor cores cannot be shared with other VNFs or virtual machines, the VMI instantiation system 310 may determine, based on the CPU status information and the available processor capacity defined therein, whether the server 316 has available at least two processor cores that can be dedicated for the new VNF or virtual machine.

If the VMI instantiation system 310 determines that there is insufficient available processor capacity for implementation of the VNF or virtual machine, the VMI instantiation system 310 may transmit a notification to the instantiation request processing system 304 to indicate that the request cannot be fulfilled. This may cause the instantiation request processing system 304 to transmit a response to the requestor specifying that the request to instantiate the VMI 306 could not be fulfilled due to a lack in available processor capacity for implementation of the new VNF or virtual machine. However, if the VMI instantiation system 310 determines that there is sufficient available processor capacity for implementation of the VNF or virtual machine (subject to the processor requirements set forth in the VMI profile 308), the VMI instantiation system 310 may select, from the available processor capacity, one or more processor cores and corresponding logical CPUs for instantiation of the VMI 306. This may result in the implementation of the new VNF or virtual machine for the user.

Figure 4:
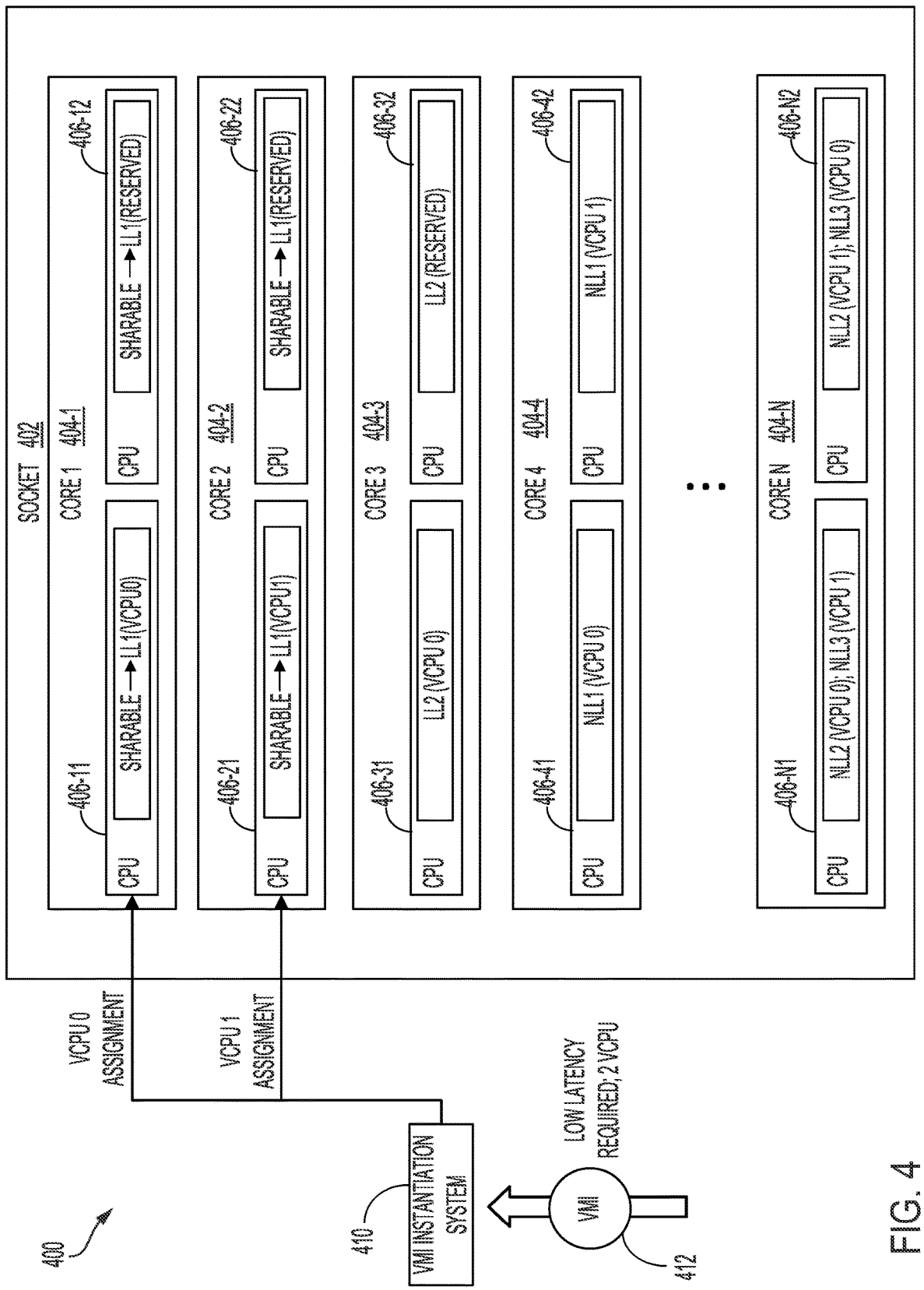
FIG. 4 shows an illustrative example of an environment in which a VMI instantiation system allocates a set of processors cores for a VMI requiring low latency performance and a set of vCPUs in accordance with some implementations.

FIG. 4 shows an illustrative example of an environment 400 in which a VMI instantiation system 410 allocates a set of processors cores for a VMI 412 requiring low latency performance and a set of vCPUs in accordance with some implementations. In the environment 400, the VMI instantiation system 410 obtains a request to instantiate a VMI 412 onto a set of processor cores provided via a server CPU socket 402. The server CPU socket 402 may include one or more processor cores 404-1-404-N, wherein each processor core 404-1-404-N is configured with hyper-threading. This may result in each processor core 404-1-404-N including at least two logical CPUs. For instance, as illustrated in FIG. 4, processor core 404-1 may implement processors 406-11 and 406-12; processor core 404-2 may implement processors 406-21 and 406-22; processor core 404-3 may implement processors 406-31 and 406-32; processor core 404-4 may implement processors 406-41 and 406-42; and processor core 404-N may implement processors 406-N1 and 406-N2.

As noted above, a request to instantiate a VMI 412 on to a set of processor cores of a server may include a VMI profile that defines a set of processor requirements for implementation of a VNF or virtual machine via instantiation of the VMI 412. In the illustrative example of FIG. 4, the VMI profile specifies that the resulting VNF or virtual machine requires low latency throughput and is to include two vCPUs (e.g., a data plane vCPU and a control plane vCPU). Based on these processor requirements, the VMI instantiation system 410 may determine that a dedicated processor core is to be allocated for each of the two vCPUs for the VNF or virtual machine.

In some examples, if the request to instantiate the VMI 412 does not include a VMI profile or otherwise does not specify a set of processor requirements for implementation of a VNF or virtual machine, the VMI instantiation system 412 can implement a set of default processor requirements for the VNF or virtual machine. For instance, by default, the VMI instantiation system 410 may assume that the VNF or other virtual machine requires low latency throughput. This may cause the VMI instantiation system 410 to determine whether dedicated processor cores for the VNF or other virtual machine can be allocated.

Based on the requirements specified in the VMI profile, or implemented by default by the VMI instantiation system 410, the VMI instantiation system 410 may determine whether the server CPU socket 402 has available at least two processor cores that have available CPU capacity that may be allocated for the vCPUs of the VNF or virtual machine. For instance, as illustrated in FIG. 4, based on the requirements that low latency throughput is required for the VNF or virtual machine and that two vCPUs are required for the VNF or virtual machine, the VMI instantiation system 410 may identify processor cores 404-1 and 404-2 as having available processor capacity for implementing the VNF or virtual machine subject to the specified requirements.

As illustrated in FIG. 4, the VMI instantiation system 410 may allocate a logical CPU 406-11 of processor core 404-1 for a control plane vCPU of the VNF or virtual machine and a logical CPU 406-21 of processor core 404-2 for a data plane vCPU of the VNF or virtual machine. Further, the VMI instantiation system 410 may designate the other logical CPUs 406-12 and 406-22 of processor cores 404-1 and 404-2, respectively, as being reserved for the VNF or virtual machine. This may prevent these logical CPUs from being allocated for other VNFs or virtual machine. Further, this may allow for the use of these logical CPUs 406-12 and 406-22 for other virtual functions, such as emulation and virtual hosting. In some instances, these other virtual functions may be implemented on to the logical CPU 406-12 of the processor core 404-1 dedicated for the control plane vCPU. This may allow for the unfettered use of computing resources of processor core 404-2 by the data plane vCPU, which may result in improved performance of the data plane vCPU and enable low latency throughput for the VNF or virtual machine.

Figure 5:
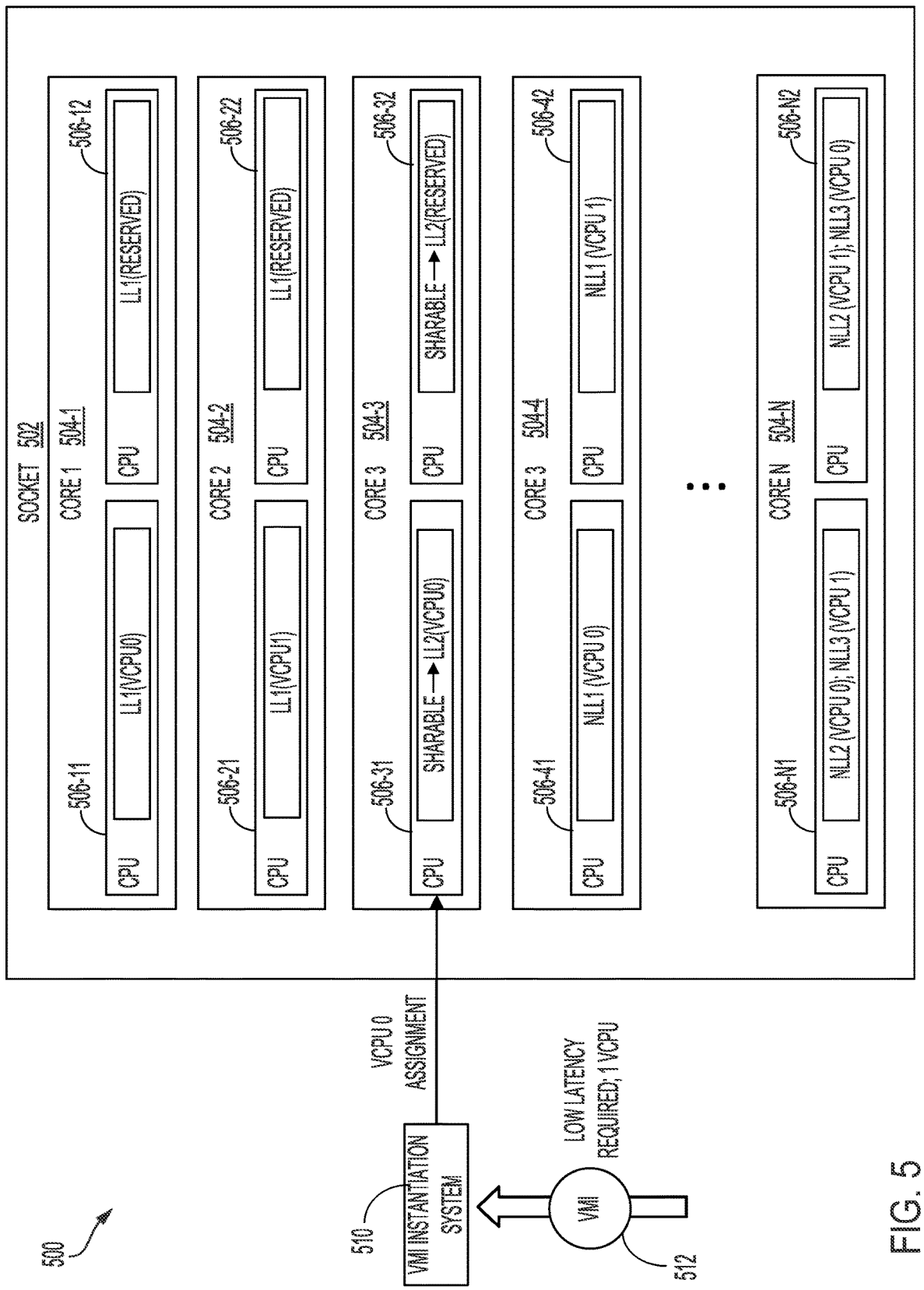
FIG. 5 shows an illustrative example of an environment in which a VMI instantiation system allocates a processor core for a VMI requiring low latency performance and a single vCPU in accordance with some implementations.

FIG. 5 shows an illustrative example of an environment 500 in which a VMI instantiation system 510 allocates a processor core for a VMI 512 requiring low latency performance and a single vCPU in accordance with some implementations. In the environment 500, the VMI instantiation system 510 obtains a request to instantiate a VMI 512 onto a processor provided via a server CPU socket 502. Similar to the server CPU socket 402 described above in connection with FIG. 4, the server CPU socket 502 may include one or more processor cores 504-1-504-N that each may implement a set of processors. For instance, as illustrated in FIG. 5, processor core 504-1 may implement processors 506-11 and 506-12; processor core 504-2 may implement processors 506-21 and 506-22; processor core 504-3 may implement processors 506-31 and 506-32; processor core 504-4 may implement processors 506-41 and 506-42; and processor core 504-N may implement processors 506-N1 and 506-N2. It should be noted that while each processor core 504-1-504-N is illustrated as implementing two processors within the processor core, each processor core 504-1-504N may include additional, alternative, or fewer processors.

The request to instantiate the VMI 512 may include a VMI profile specifying a set of requirements for allocating available processor capacity to the VNFs or other virtual machines that are to be implemented using the VMI 512. In this illustrative example, the VMI profile may specify that the VNF that is to be implemented through instantiation of the VMI 512 is to have low latency throughput. Further, the VMI profile may specify that the VNF is to include a single vCPU (e.g., vCPU 0). In some examples, the VMI profile can also indicate that the single vCPU is to be implemented on a dedicated processor core or on a dedicated physical CPU. However, if this indication is not present in the VMI profile for a VNF requiring low latency throughput, the VMI instantiation system 510 may utilize one or more default requirements to determine whether to allocate either a dedicated processor core or dedicated physical CPU for the VNF.

Based on the requirements specified in the VMI profile, the VMI instantiation system 510 may identify one or more processors cores that have available CPU capacity that may be allocated for the vCPU of the VNF or other virtual machine. For instance, as illustrated in FIG. 5, based on the requirements that low latency throughput is required for the VNF or other virtual machine and that a single vCPU is required for the VNF or other virtual machine, the VMI instantiation system 510 may identify processor core 504-3 as having available processor capacity for implementing the low latency processors for the VNF or other virtual machine subject to the specified requirements.

In an example, the VMI instantiation system 510 assigns the available processor core 504-3 to the VNF or other virtual machine to enable functionality of the single vCPU for the VNF or other virtual machine. The VMI instantiation system 510 may designate the processors 506-31 and 506-32 of processor core 504-3 as being non-shareable (e.g., reserved) and for the exclusive use of the VNF or other virtual machine. For instance, as illustrated in FIG. 5, while the vCPU of the VNF or other virtual machine may be implemented using processor 506-31, the VMI instantiation system 510 may designate processor 506-32 of the processor core 504-3 as being reserved for the VNF (e.g., "LL2," as illustrated in FIG. 5). Thus, while processor 506-32 may remain idle, the processor capacity for this processor may remain allocated for the VNF.

In some examples, the available processor capacity allocated for the VNF or other virtual machine that is not used for the vCPU of the VNF or other virtual machine can otherwise be utilized to implement an emulator or any other virtual functionality (e.g., virtual hosts, etc.) for the VNF or other virtual machine. The emulator or other virtual functionality may provide virtualized server functions, network connectivity services, and the like.

Figure 6:
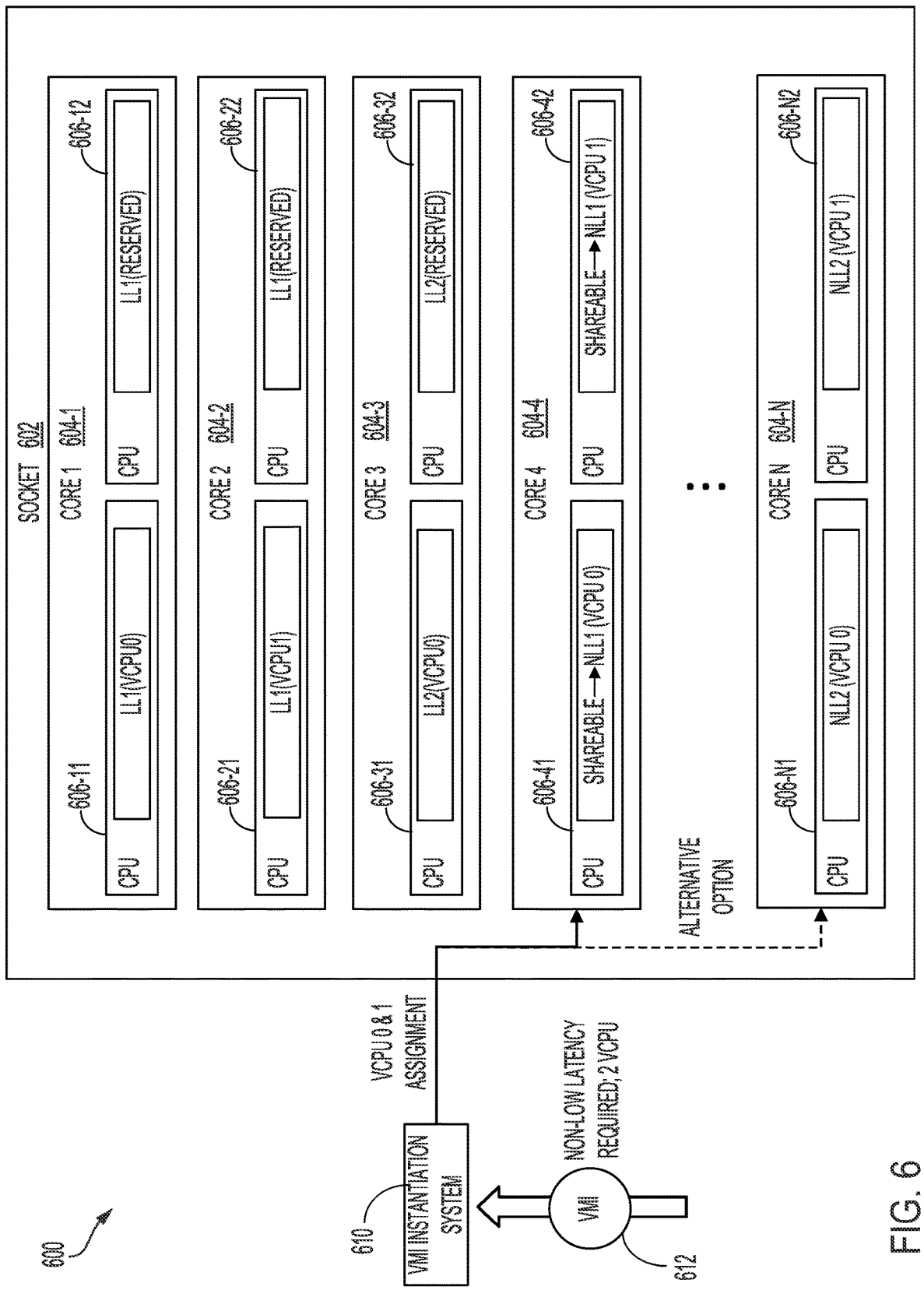
FIG. 6 shows an illustrative example of an environment in which a VMI instantiation system allocates shareable CPUs for a VMI requiring non-low latency performance and a set of vCPUs in accordance with some implementations.

FIG. 6 shows an illustrative example of an environment 600 in which a VMI instantiation system 610 allocates shareable CPUs for a VMI 612 requiring non-low latency performance and a set of vCPUs in accordance with some implementations. In the environment 600, the VMI instantiation system 610 obtains a request to instantiate a VMI 612 onto a set of processors provided via a server CPU socket 602. The server CPU socket 602 may include one or more processor cores 604-1-604-N that each may implement a set of processors. For instance, as illustrated in FIG. 6, processor core 604-1 may implement processors 606-11 and 606-12; processor core 604-2 may implement processors 606-21 and 606-22; processor core 604-3 may implement processors 606-31 and 606-32; processor core 604-4 may implement processors 606-41 and 606-42; and processor core 604-N may implement processors 606-N1 and 606-N2. It should be noted that while each processor core 604-1-604-N is illustrated as implementing two processors within the processor core, each processor core 604-1-604N may include additional, alternative, or fewer processors.

The request to instantiate the VMI 612 may include a VMI profile specifying a set of requirements for allocating available processor capacity for use in implementing the VNFs or other virtual machines through instantiation of the VMI 612. In this illustrative example, the VMI profile may specify that non-low latency is required for the VNFs or other virtual machines. Further, the VMI profile may specify that two vCPUs are to be implemented for the VNFs or other virtual machines. In some instances, the VMI profile may further specify that one of the two vCPUs is to be designated as a control plane vCPU (e.g., vCPU 0) and that the other is to be designated as a data plane vCPU (e.g., vCPU 1).

In an example, the VMI instantiation system 610 maintains a requirement that data plane vCPUs for different VNFs or other virtual machines are to be implemented on separate, physical CPUs in order to prevent unpredictable behavior of these VNFs or other virtual machines. In some instances, this requirement may be maintained by the VMI instantiation system 610 as a default. Thus, if the VMI profile does not specify a requirement that the data plane vCPU for a VNF or other virtual machine is to be implemented on a CPU other than a CPU that implements a different data plane vCPU, the VMI instantiation system 610 may apply this requirement as a default. In some instances, if the VMI profile specifies a requirement that may conflict with this default requirement, the VMI instantiation system 610 may transmit a notification to the requestor to indicate the conflict and inform the requestor of the potential impact resulting from two or more data plane vCPUs sharing capacity of a physical CPU. The requestor, via an interface, may update the VMI profile or otherwise indicate that it either assumes the risk of the potential impact to its VNFs or other virtual machines or acquiesce to this default requirement.

Based on the requirements specified in the VMI profile, the VMI instantiation system 610 may identify one or more processors cores that have available CPU capacity that may be allocated for the vCPUs of the VNFs or other virtual machines. For instance, as illustrated in FIG. 6, based on the requirements that non-low latency is required for the VNFs or other virtual machines and that two vCPUs are required for the VNFs or other virtual machines, the VMI instantiation system 610 may identify processor core 604-4 and 604-N as having available processor capacity for implementing the two vCPUs for the VNFs or other virtual machines subject to the specified requirements.

In an example, if more than one processor core has available processor capacity for implementing the two vCPUs for the VNFs or other virtual machines, the VMI instantiation system 610 can select the processor core that provides the most processor capacity for the vCPUs. For instance, as illustrated in FIG. 6, while processor core 604-N has available processor capacity that can be allocated for the two vCPUs, implementation of the two vCPUs on to the processor core 604-N may result in the sharing of resources of this processor core 604-N with other VNFs or virtual machines implemented on the processor core 604-N. For instance, the processor core 604-N may implement a control plane vCPU (e.g., vCPU 0) for another VNF or virtual machine on processor 606-N1 and a data plane vCPU (e.g., vCPU 1) for the other VNF or virtual machine on processor 606-N2. Thus, the VMI instantiation system 610 may select processor core 604-4 for implementation of the vCPUs for the new VNFs or other virtual machines, whereby the processor core 606-4 may include unallocated processors 606-41 and 606-42.

It should be noted that other criteria may be used to select a processor core or a particular CPU from a processor core from a set of available options for implementation of vCPUs of a VNF or other virtual machine. For instance, if the available processor capacity within processor core 604-N is greater than the available processor capacity of processor core 604-4, the VMI instantiation system 610 may opt to allocate the available processor capacity of processor core 604-N to the new vCPUs regardless of whether the CPUs 606-41 and 606-42 of processor core 604-4 are unallocated or utilized for other VNFs or virtual machines. Additionally, or alternatively, the VMI instantiation system 610 may identify the specifications of the processors that provide the available processor capacity to determine which would provide the better performance for the VNFs or other virtual machines. For example, the VMI instantiation system 610 may evaluate the VMI 612 to identify the system requirements for implementation of the VNFs or other virtual machines. Based on these system requirements and the specifications of the processors that provide the available processor capacity, the VMI instantiation system 610 may select an appropriate processor core for implementation of the VNFs or other virtual machines.

Figure 7:
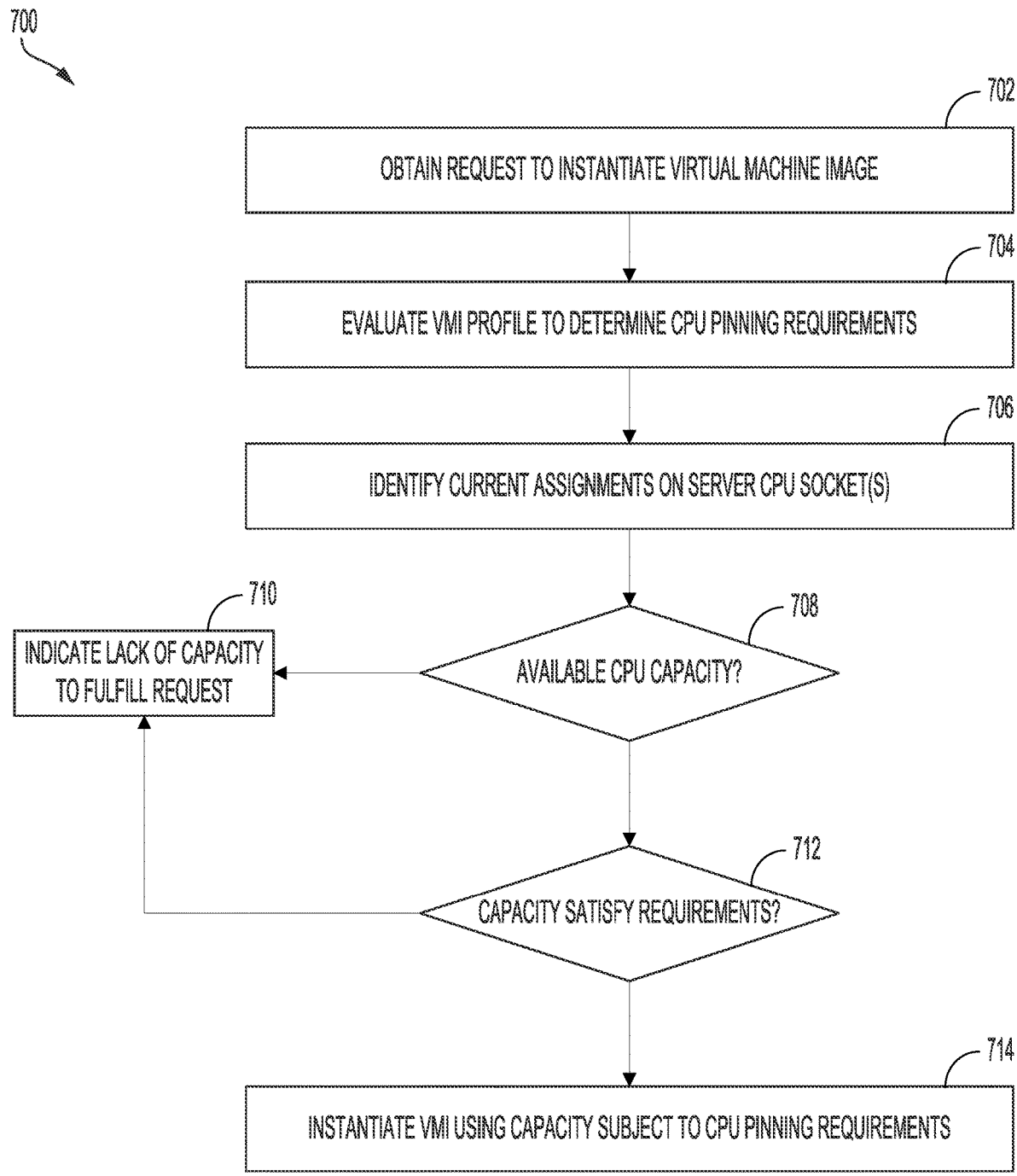
FIG. 7 shows an illustrative example of a process for instantiating a virtual machine image using available processor capacity of a set of processor cores subject to a set of CPU pinning requirements in accordance with some implementations.

FIG. 7 shows an illustrative example of a process 700 for instantiating a virtual machine image using available processor capacity of a set of processor cores subject to a set of CPU pinning requirements in accordance with some implementations. The process 700 may be performed by a virtual machine management service, which may identify the available processor capacity of one or more servers and determine, based on this available capacity, whether instantiation of the virtual machine image is possible in a manner that satisfies the processor requirements specified in the request, either with the virtual machine image or indicated by the requestor.

In an example, the virtual machine management service obtains 702 a request to instantiate a virtual machine image. The virtual machine image may serve as a template for creating a virtual machine that may be used to implement one or more VNFs, a virtual computer system, and the like. In some examples, the virtual machine image may include a virtual machine image profile, which may specify the processor requirements for instantiation of the virtual machine image to implement the VNFs or other virtual machines. Alternatively, the requestor may provide, in addition to the virtual machine image, the virtual machine image profile.

In response to the request, the virtual machine management service may evaluate 704 the virtual machine image profile provided in the request (either within the virtual machine image package or as a standalone profile provided in the request) to determine the CPU pinning requirements for the one or more vCPUs of the VNFs or other virtual machine that is to be implemented using the virtual machine image. For instance, the virtual machine image profile may specify a requirement that the VNFs are to be implemented with low latency throughput. This may serve as an indication that the vCPUs of the VNFs are to be implemented on dedicated, non-shareable processor cores. Further, the virtual machine image profile may specify a requirement that data plane vCPUs of the VNFs are to be maintained in separate processor cores. As noted above, pinning data plane vCPUs of different VNFs onto the same processor core or the same CPU thread can result in unpredictable performance of these different VNFs. Thus, the virtual machine image profile may specify this requirement. In some examples, this requirement may be defined by default by the virtual machine management service such that, if the virtual machine image profile does not specify this requirement, the virtual machine management service may apply the requirement automatically.

In some examples, the virtual machine image profile can specify that the VNFs do not require dedicated processor cores for each vCPU. This may serve as an indication to the virtual machine management service that the CPUs that are to be allocated for the VNFs can be shared with other VNFs and virtual machines. However, in some examples, the virtual machine management service may maintain a requirement that data plane vCPUs of different VNFs are not to be implemented on the same processor core or on the same CPU of a processor core. Thus, while a data plane vCPU of a VNF can be implemented on a CPU that may be shared with other VNFs, the virtual machine management service may allocate, to this CPU, control plane vCPUs of other VNFs.

In an example, the virtual machine management service identifies 706 the current processor assignments on the server CPU sockets. For instance, for a particular server CPU socket, the virtual machine management service may evaluate each processor core and corresponding CPUs to identify the VNFs and other virtual machines utilizing the CPUs of the server CPU socket. In some instances, the virtual machine management service may evaluate a database that specifies, for each VNF and virtual machine, identifiers corresponding to CPUs and processor cores allocated for the VNF or virtual machine. Further, the virtual machine management service may determine the processor requirements for each of the VNFs and virtual machines implemented on to processor cores and CPUs of a server socket.

Based on this identification of the current assignments on the server CPU sockets, the virtual machine management service may determine 708 whether there is available CPU capacity that can be allocated for instantiation of the virtual machine image and to implement the VNFs. For instance, the virtual machine management service may identify any unallocated CPUs from the various processor cores of the sockets that may be available for the VNFs or other virtual machines that are to be implemented in response to the request. The virtual machine management service may evaluate the aforementioned database to identify any CPUs that have not been allocated for use. In some instances, while a CPU may be idle (e.g., not in use), the CPU may be reserved for another VNF or virtual machine that requires reservation of a processor core for each vCPU of the virtual machine. Thus, while the CPU may have capacity to support a VNF or virtual machine, the CPU may still be unavailable for allocation to the VNF or virtual machine.

In some examples, the virtual machine management service determines whether any VNFs or virtual machines currently utilizing processor capacity of the socket are scheduled for deletion. If the virtual machine management service determines that a VNF or other virtual machine is scheduled for deletion at a particular time, the virtual machine management service may determine that the processor capacity utilized by the VNF or other virtual machine is to become available upon deletion of the VNF or other virtual machine at the particular time. Thus, in determining the available processor capacity for instantiation of the virtual machine image, the virtual machine management service may identify any VNFs or other virtual machines that are scheduled for deletion within a particular time frame for instantiation of the obtained virtual machine image.

If the virtual machine management service determines that there is no available processor capacity for instantiation of the virtual machine image and implementation of the VNFs or other virtual machines, the virtual machine management service may indicate 710 a lack of capacity necessary for fulfillment of the request. For instance, the virtual machine management service may deny the request and transmit a notification to the requestor to indicate that there is no available processor capacity for instantiation of the virtual machine image. In some instances, the virtual machine management service may repeat the process 700 subject to a timeout period to identify any available processor capacity. Thus, if there is no available process capacity, and the timeout period has not elapsed, the virtual machine management service may continue evaluating the current assignments on the server CPU sockets to determine whether previously allocated processor capacity has become available for allocation to the VNFs or other virtual machines to be instantiated using the virtual machine image.

In an example, if the virtual machine management service determines that there is available processor capacity that could, in theory, be used for instantiation of the virtual machine image and implement the VNFs or other virtual machines, the virtual machine management service may determine 712 whether this available processor capacity, if allocated, would satisfy the requirements provided in the request. As noted above, through the virtual machine image profile, a requestor may specify that the VNFs or other virtual machine that are to be implemented using the virtual machine image are to have low latency or non-low latency throughput. Further, through the virtual machine image profile, the requestor may specify additional allocation requirements, such as defining that data plane vCPUs of the VNFs are not to be placed on to the same processor core or CPU of a processor core. Thus, based on these requirements, the virtual machine management service may evaluate the processor cores and CPUs that comprise the available processor capacity to determine whether allocation of this available processor capacity would satisfy the requirements set forth in the virtual machine image profile.

If the virtual machine management service determines that allocation of the available processor capacity would not satisfy the requirements set forth in the virtual machine image profile, the virtual machine management service may indicate 710 the lack of processor capacity for fulfillment of the request. The virtual machine management service may indicate, to the requestor, that while there is available processor capacity within the server sockets, allocation of this capacity would result in one or more requirements being unsatisfied, which may hinder performance of the VNFs or other virtual machines if implemented using this available processor capacity. In some examples, the virtual machine management service repeats the process 700 subject to a timeout period to identify any new available processor capacity that, if allocated, would satisfy the set of requirements set forth in the virtual machine image profile. Thus, if the timeout period has not elapsed, the virtual machine management service may continue evaluating the available processor capacity and the current processor allocations for other VNFs and virtual machines to determine whether the available processor capacity can be allocated for the new VNFs or other virtual machines subject to the requirements set forth in the virtual machine image profile.

In an example, if the virtual machine management service determines that the available processor capacity, if used, would satisfy the set of requirements set forth in the virtual machine image profile, the virtual machine management service instantiates 714 the virtual machine image using the available processor capacity subject to the CPU pinning requirements specified in the virtual machine image profile. For instance, if the CPU pinning requirements indicate that a dedicated processor core is required for each vCPU (e.g., data plane vCPU, control plane vCPU, etc.) of a VNF, the virtual machine management service may allocate at least two processor cores that may be used to implement the VNF. Any unused capacity of these at least two processor cores may be reserved for the VNF such that, in response to subsequent requests to instantiate another virtual machine image, the virtual machine management service may determine that these at least two processor cores and the CPUs therein are unavailable for use in instantiating the other virtual machine image.

In an example, if the CPU pinning requirements specify that low latency throughput is not required (e.g., non-low latency), the virtual machine management service allocates available processor capacity from any of the processor cores to the VNFs or other virtual machines to be implemented using the virtual machine image. For instance, if the virtual machine management service allocates one or more processors that were previously unallocated to other VNFs or other virtual machines, the virtual machine management service may indicate that these one or more processors are shareable. Thus, in response to future requests to allocate available processor capacity for a non-low latency VNF or other virtual machine, the virtual machine management service may allocate the available capacity from these shareable processors for use by the new non-low latency VNF or other virtual machine subject to the CPU pinning requirements of the previously implemented VNF or virtual machine and the CPU pinning requirements of the new non-low latency VNF or other virtual machine.

FIG. 8 illustrates an example network device 800 suitable for performing switching, routing, and other networking operations in accordance with some implementations. Network device 800 includes a CPU 804, interfaces 802, and a connection 810 (e.g., a Peripheral Component Interconnect (PCI) bus). When acting under the control of appropriate software or firmware, the CPU 804 is responsible for executing packet management, error detection, and/or routing functions. The CPU 804 can accomplish these functions under the control of software including an operating system and any appropriate applications software. The CPU 804 may include one or more processors 808, such as a processor from the Intel® X98 family of microprocessors. In some cases, the processor 808 can be specially designed hardware for controlling the operations of network device 800. In some cases, a memory 806 (e.g., non-volatile RAM, ROM, etc.) also forms part of the CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the connection 810, to exchange data and signals and coordinate various types of operations by the network device 800, such as routing, switching, and/or data storage operations, for example.

FIG. 9 illustrates a computing system architecture 900 including various components in electrical communication with each other using a connection 906, such as a bus, in accordance with some implementations. Example system architecture 900 includes a processing unit (CPU or processor) 904 and a system connection 906 that couples various system components including the system memory 920, such as ROM 918 and RAM 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, RAMs 916, ROM 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method comprising:
   obtaining a request to instantiate a virtual machine image to implement a set of virtual network functions (VNFs), the request specifying allocation of non-shareable first processor cores for data plane virtual central processing units (vCPUs) and shareable second processor cores for control plane vCPUs for the set of VNFs;
   identifying available processor capacity for the data plane vCPUs comprising a first set of processor cores each having plurality of threads configured to implement virtual machines and the identifying disregards processor cores that already have one or more threads assigned to another VNF, not part of the set of VNFs, from the first set of processor cores;

selecting, based on the identified available processor capacity for the data plane vCPUs, a first subset of the first set of processor cores to allocate for the data plane vCPUs;

identifying available processor capacity for the control plane vCPUs comprising a second set of processor cores each having a plurality of threads configured to implement virtual machines and the identifying includes processor cores that already have one or more threads assigned to another VNF in the second set of processor cores;

selecting, based on the identified available processor capacity for the control plane vCPUs, a second subset of the second set of processor cores to allocate for the control plane vCPUs; and instantiating, based on the selecting a second subset, the virtual machine image on to the selected first subset of the processor cores and the selected second subset of processor cores.

2. The computer-implemented method of claim 1, further comprising:
determining that other virtual machines implemented on the set of processor cores are to be deleted at a specific time; and
determining that capacity of the set of processor cores used by the other virtual machines is available at the specific time.

3. The computer-implemented method of claim 1, wherein:
identifying, from the available processor capacity, at least one processor core that satisfies one or more processor requirements, wherein the processor core is reserved to the VNFs.

4. The computer-implemented method of claim 1, wherein:
selecting, from the available processor capacity, a set of available processors from the subset of processor cores to implement the VNFs.

5. The computer-implemented method of claim 4, wherein selecting the set of available processors includes assigning data plane vCPUs to different processors of the set of available processors.

6. The computer-implemented method of claim 1, further comprising:
obtaining a second request to terminate a virtual machine operating on the subset of the processor cores; and
terminating, in response to the second request, the virtual machine.

7. The computer-implemented method of claim 6, further comprising:
reserving capacity of the subset of the processor cores for the virtual machine.

8. A system, comprising:
one or more processors; and
a non-transitory computer readable memory including instructions that, as a result of being executed by the one or more processors, cause the system perform operations including:
obtain a request to instantiate a virtual machine image to implement a set of virtual network functions (VNFs), the request specifying allocation of non-shareable first processor cores for data plane virtual central processing units (vCPUs) and shareable second processor cores for control plane vCPUs for the set of VNFs;
identify available processor capacity for the data plane vCPUs comprising a first set of processor cores each having plurality of threads configured to implement virtual machines and the identifying disregards processor cores that already have one or more threads assigned to another VNF, not part of the set of VNFs, from the first set of processor cores;

select, based on the identified available processor capacity for the data plane vCPUs, a first subset of the first set of processor cores to allocate for the data plane vCPUs;

identify available processor capacity for the control plane vCPUs comprising a second set of processor cores each having a plurality of threads configured to implement virtual machines and the identifying includes processor cores that already have one or more threads assigned to another VNF in the second set of processor cores;

select, based on the identified available processor capacity for the control plane vCPUs, a second subset of the second set of processor cores to allocate for the control plane vCPUs; and instantiate, based on the selecting a second subset, the virtual machine image on to the selected first subset of the processor cores and the selected second subset of processor cores.

9. The system of claim 8, the operations further comprising:
determine that other virtual machines implemented on the set of processor cores are to be deleted at a specific time; and
determine that capacity of the set of processor cores used by the other virtual machines is available at the specific time.

10. The system of claim 8, wherein:
Identify, from the available processor capacity, at least one processor core that satisfies one or more processor requirements, wherein the processor core is reserved to the VNFs.

11. The system of claim 8, wherein:
select, from the available processor capacity, a set of available processors from the subset of processor cores to implement the VNFs.

12. The system of claim 11, wherein selecting the set of available processors includes assigning data plane vCPUs to different processors of the set of available processors.

13. The system of claim 8, the operations further comprising:
obtain a second request to terminate a virtual machine operating on the subset of the processor cores; and
terminate, in response to the second request, the virtual machine.

14. The system of claim 13, the operations further comprising:
reserve capacity of the subset of the processor cores for the virtual machine.

15. A non-transitory computer-readable storage media storing thereon executable instructions that, as a result of being executed by one or more processors of a computer system, cause the computer system perform operations comprising:
obtain a request to instantiate a virtual machine image to implement a set of virtual network functions (VNFs), the request specifying allocation of non-shareable first processor cores for data plane virtual central processing units (vCPUs) and shareable second processor cores for control plane vCPUs for the set of VNFs;
identify available processor capacity for the data plane vCPUs comprising a first set of processor cores each having plurality of threads configured to implement virtual machines and the identifying disregards processor cores that already have one or more threads assigned to another VNF, not part of the set of VNFs, from the first set of processor cores;

select, based on the identified available processor capacity for the data plane vCPUs, a first subset of the first set of processor cores to allocate for the data plane vCPUs;

identify available processor capacity for the control plane vCPUs comprising a second set of processor cores each having a plurality of threads configured to implement virtual machines and the identifying includes processor cores that already have one or more threads assigned to another VNF in the second set of processor cores;

select, based on the identified available processor capacity for the control plane vCPUs, a second subset of the second set of processor cores to allocate for the control plane vCPUs; and instantiate, based on the selecting a second subset, the virtual machine image on to the selected first subset of the processor cores and the selected second subset of processor cores.

16. The non-transitory computer-readable storage media system of claim 15, the operations further comprising:

determine that other virtual machines implemented on the set of processor cores are to be deleted at a specific time; and determine that capacity of the set of processor cores used by the other virtual machines is available at the specific time.

17. The non-transitory computer-readable storage media of claim 15, wherein:

Identify, from the available processor capacity, at least one processor core that satisfies one or more processor requirements, wherein the processor core is reserved to the VNFs.

18. The non-transitory computer-readable storage media of claim 15, wherein:

select, from the available processor capacity, a set of available processors from the subset of processor cores to implement the VNFs.

19. The non-transitory computer-readable storage media of claim 15, wherein selecting the set of available processors includes assigning data plane vCPUs to different processors of the set of available processors.

20. The non-transitory computer-readable storage media of claim 15, the operations further comprising:

obtain a second request to terminate a virtual machine operating on the subset of the processor cores;

terminate, in response to the second request, the virtual machine; and reserve capacity of the subset of the processor cores for the virtual machine.

* * * * *